US010995258B1

(12) United States Patent
Zhou et al.

(10) Patent No.: US 10,995,258 B1
(45) Date of Patent: May 4, 2021

(54) REMOVING FILTER CAKE WITH DELAYED ENZYMATIC BREAKERS

(71) Applicant: Halliburton Energy Services, Inc., Houston, TX (US)

(72) Inventors: Hui Zhou, The Woodlands, TX (US); Jay Paul Deville, Spring, TX (US); William Walter Shumway, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/732,799

(22) Filed: Jan. 2, 2020

(51) Int. Cl.
    *E21B 21/00* (2006.01)
    *C09K 8/524* (2006.01)
    *E21B 37/00* (2006.01)

(52) U.S. Cl.
    CPC .............. *C09K 8/524* (2013.01); *E21B 37/00* (2013.01); *C09K 2208/24* (2013.01); *E21B 21/003* (2013.01)

(58) Field of Classification Search
    CPC ..... C09K 8/524; C09K 2208/24; E21B 37/00; E21B 21/003
    See application file for complete search history.

(56) References Cited

U.S. PATENT DOCUMENTS

| 5,067,566 A | 11/1991 | Dawson | |
|---|---|---|---|
| 5,226,479 A | 7/1993 | Gupta | |
| 5,247,995 A * | 9/1993 | Tjon-Joe-Pin | C09K 8/512 166/312 |
| 5,437,331 A * | 8/1995 | Gupta | C09K 8/685 166/300 |
| 5,881,813 A * | 3/1999 | Brannon | C09K 8/605 166/304 |

(Continued)

FOREIGN PATENT DOCUMENTS

| EP | 2444413 A1 | 4/2012 |
|---|---|---|
| WO | 2018039340 A1 | 3/2018 |

OTHER PUBLICATIONS

Elkatatny et al, Investigating the Compatibility of Enzyme with Chelating Agents for Calcium Carbonate Filter Cake Removal, Arabian Journal for Science and Engineering (2018) 43:2309-2318.

(Continued)

*Primary Examiner* — Silvana C Runyan
(74) *Attorney, Agent, or Firm* — Chamberlain Hrdlicka

(57) ABSTRACT

A composition for servicing a borehole in a subterranean formation by removing a filter cake along a wall of the borehole includes a biopolymer, the composition including a carrier fluid effective to act as a transport medium; an enzymatic breaker having activity to degrade the biopolymer in the filter cake upon contact with the filter cake so as to break up the biopolymer for removal; and an enzyme inhibitor effective to slow down the activity of the enzymatic breaker; where the composition may exclude the biopolymer. A method of servicing a borehole includes contacting the filter cake with the composition; degrading the biopolymer with the enzymatic breaker to produce degraded biopolymer; slowing down the degrading activity of the breaker with the enzyme inhibitor sufficiently that the degrading comprises degrading biopolymer along a length of the wall of the borehole; and removing the filter cake from the wall of the borehole.

20 Claims, 4 Drawing Sheets

(56) References Cited

U.S. PATENT DOCUMENTS

| | | | |
|---|---|---|---|
| 9,803,130 | B2 | 10/2017 | Mirakyan |
| 10,214,681 | B2 | 2/2019 | Lee |
| 2002/0193343 | A1 | 12/2002 | Khan |
| 2005/0130845 | A1* | 6/2005 | Freeman ............... C09K 8/665 507/100 |
| 2008/0107619 | A1 | 5/2008 | Scharf |
| 2010/0069266 | A1 | 3/2010 | Battistel |
| 2012/0208726 | A1 | 8/2012 | Smith |
| 2014/0151042 | A1 | 6/2014 | Faugerstrom |
| 2017/0240803 | A1 | 8/2017 | Chopade |

OTHER PUBLICATIONS

Paloma Michelle De Sales et al., α-Amylase Inhibitors: A Review of Raw Material and Isolated, Journal of Pharmacy and Pharmaceutical Sciences 15(1) 141-183, 2012.
Qin et al, Inhibition of lignin-derived phenolic compounds to cellulase, Biotechnology for Biofuels (2016) 9:70.
Ximenes et al, Inhibition of cellulases by phenols, Enzyme and Microbial Technology 46 (2010) 170-167.
International Search Report and Written Opinion dated Sep. 25, 2020 for PCT/US2020/012126, filed Jan. 3, 2020, 12 pgs.

* cited by examiner

REMOVING FILTER CAKE WITH DELAYED ENZYMATIC BREAKERS

BACKGROUND

Natural resources such as gas, oil, and water residing in a subterranean formation or zone are usually recovered by drilling a borehole down to the subterranean formation while circulating a drilling fluid in the borehole. During the drilling operation, a drilling fluid, also referred to as drilling mud, is conventionally circulated through the borehole as the borehole is drilled. The drilling mud aids in the drilling operation, for example, by removing cuttings from the borehole, (e.g., by suspending cuttings for return to the surface), controlling pressures within the subterranean formation, sealing permeable and/or semi-permeable portions of the subterranean formation, stabilizing the subterranean formation, cooling and lubricating the drilling apparatus, and facilitating completion operations.

As the drilling mud is circulated through the borehole, solid components of the drilling mud are deposited on the surfaces of the borehole in a layer known as a "filter cake," thus inhibiting the loss of mud or other borehole fluids to the formation during the drilling and/or other servicing operations. The composition of the filter cake varies with the drilling fluid and may include a biopolymer such as starch, cellulose, guar gum, and derivatives thereof, which acts as a viscosifier or a fluid loss control additive; and a bridging agent such as calcium carbonate to aid in preventing or reducing loss of drilling fluid into the formation.

Prior to production, the filter cake is removed to allow the unimpeded flow of natural resources into the borehole from the formation. A need exists to remove the filter cake efficiently and uniformly at a wide range of temperatures while minimizing damage to the formation or the borehole. To do so, a filter cake breaker may be used to degrade the biopolymer in the filter cake and thus aid in the removal of the filter cake. While working temperatures of most wells may be from 100° F. (20° C.) or lower to 200° F. (90° C.) or more, conventional acidic filter cake breakers may work less efficiently with slower removal rates at working temperatures less than 150° F. (65° C.), typical of shallower wells and colder climates. Further, use of strong acids to remove the filter cake may result in damage to the formation and corrosion to equipment.

Enzymes can hydrolyze the biopolymer that occur in filter cakes very efficiently at lower temperatures and with minimal corrosion risk. However, the enzymes tend to act too fast, resulting in uneven removal of the biopolymer of the filter cake along the borehole, premature breakthrough, and leak-off of treatment fluids into the formation. Enzymes have been used as breakers for fracturing fluids to break the viscosifying gels after the viscosifier gels are used in placing proppant in formations. Encapsulation of the enzyme can slow the hydrolysis in fracturing fluids, in which the enzyme capsules are dispersed and stabilized by a viscosifying agent, but this technique is not suitable for breaker fluids, which use brine and lack the viscosity to suspend the enzyme capsules evenly, resulting in capsule aggregation and uneven breaking and premature breakthrough.

BRIEF DESCRIPTION OF THE DRAWINGS

Embodiments of the composition of the disclosure are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

Figure 1:
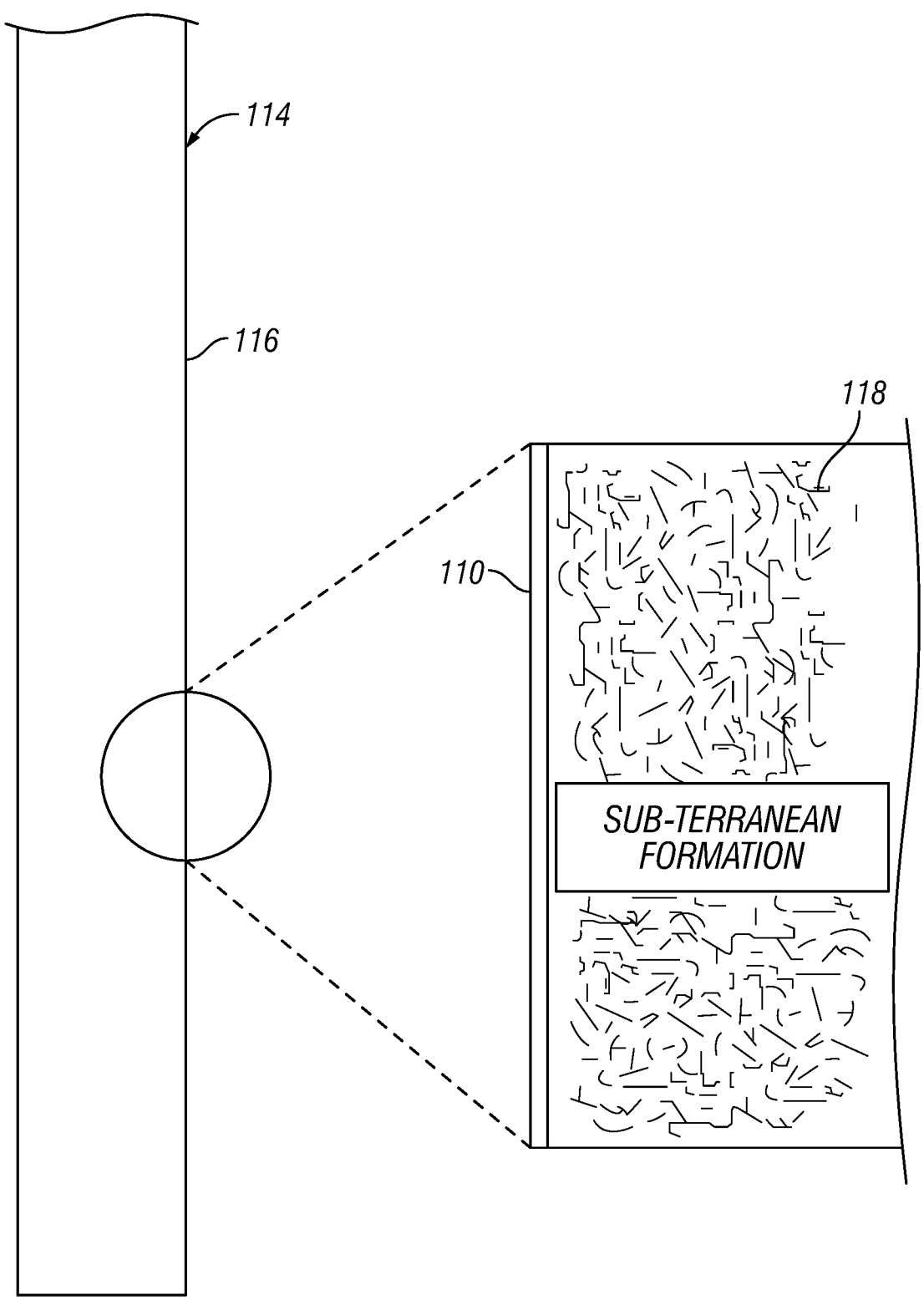
FIG. 1 is a diagram illustrating a borehole with a filter cake formed on a subterranean formation according to one or more embodiments.

The present disclosure provides compositions and systems and methods to remove a filter cake from a borehole.

The compositions of the present disclosure degrade the biopolymer of the filter cake along an interval of the borehole effectively at temperatures of 150° F. and less. To do so, the compositions include an enzymatic breaker to hydrolyze the biopolymer and an enzyme inhibitor to slow the hydrolysis of the biopolymers in the filter cake, thus providing a desirable delay in the degradation of biopolymer in the filter cake by the enzymatic breaker and resulting in a more uniform removal of the filter cake.

The compositions include an enzymatic breaker, an enzyme inhibitor, and a carrier fluid. The compositions may also include one or more optional ingredients to improve its effectiveness.

The enzymatic breaker is a hydrolase that is a carbohydrate-hydrolyzing enzyme matched to hydrolyze the particular filter cake biopolymer. For example, amylase is used to degrade starch or starch derivatives, cellulase is used to degrade cellulose and xanthan gum and their derivatives, galactomannanase is used to degrade guar gum and guar gum derivatives, xanthanase is used to degrade xanthan gum and its derivatives, and glycoside hydrolases are used to degrade diverse biopolymers such as scleroglucan, alginate, diutan gum, welan gum and carrageenen and their derivatives. The enzymatic breaker is included in the composition at a concentration of from 0 volume % to 5 volume %. The enzymatic breaker may be included in the composition at a concentration of from 0.0001 volume % to 3 volume %. The enzymatic breaker may be included in the composition at a concentration of from 0.001 volume % to 2 volume %. It will be understood that the endpoints may be determined by the enzyme activity and strength. A higher concentration is advantageous if the enzyme strength is low or the enzyme activity is decreased in the breaker fluid (either by pH or salt, for instance) and/or if the temperature requires more enzyme. The concentration desirably ensures complete breaking of the polymer.

The enzyme inhibitor is used to moderate the action of the enzymatic breaker on the biopolymer of the filter cake. Moderating the action enables the enzymatic breaker to be more uniformly distributed along an interval of the borehole without acting too quickly. Examples of enzyme inhibitors include phenolic inhibitors such as phenol and polyphenols such as lignin and lignite, their salts and esters; carbohydrate-based cellulase inhibitors like cellobiose, acarbose, miglitol, voglibose; vitamins such as ascorbic acid and folic acid; and other natural products such as chlorogenic acid, caffeic acid, tannins, flavenoids, and cinnamic acid and its derivatives. The enzyme inhibitor is included in the composition at a concentration of from 0 volume % to 10 volume %. The enzyme inhibitor may be included in the composition at a concentration of from 0.0001 volume % to 5 volume %. The enzyme inhibitor may be included in the composition at a concentration of from 0.001 volume % to 3 volume %. It will understood that enzyme inhibitors work by binding with the enzyme and blocking the active site, and the concentration of enzyme inhibitor may be determined by the delay desired.

The carrier fluid both maintains hydrostatic pressure in the borehole and serves as a transport medium for the other ingredients of the composition. For example, the carrier fluid may be brine, a clear aqueous solution of inorganic salts. Suitable inorganic salts include halogen, carbonate and sulfate salts of ammonium or metals such as sodium, calcium, potassium, zinc or cadmium. Examples of inorganic salts include sodium chloride, ammonium chloride, calcium chloride, calcium bromide, and potassium chloride. The salts used in the brine may be used either alone or in combination. Brine densities may be from 8.5 pounds per gallon to 20 pounds per gallon. For example, brine densities may be from 9 pounds per gallon to 20 pounds per gallon. For example, brine densities may be from 9 pounds per gallon to 16 pounds per gallon. For example, brine densities may be from 9.5 pounds per gallon to 15 pounds per gallon. For example, brine densities may be from 9.5 pounds per gallon to 14 pounds per gallon. The brine density may be 14.2 pounds per gallon when the brine includes calcium bromide. It will be understood that the choice of salts used in the brine and the density of the brine may depend on compatibility with the enzyme breaker of the composition as well as compatibility with the subterranean formation in which the composition is used.

The composition can also include one or more optional ingredients. These optional ingredients can improve effectiveness by maintaining the pH of the composition in the working environment, by dissolving or dispersing ingredients with low water solubility, or by reacting with components of the filter cake to facilitate their removal.

One optional ingredient for the composition of this disclosure is an acid generator. When the inorganic bridging agent of the filter cake is a carbonate salt, the weak acid reacts with the carbonate anion and converts the bridging agent to a salt more easily removable from the filter cake. The acid generator may be a weak acid, that is, one that does not fully dissociate in aqueous solution, such as formic acid, acetic acid, propionic acid, citric acid, lactic acid, glycolic acid and the like; or esters of weak organic acids such as mono- or polyesters of ethylene glycol, propylene glycol, glycerol, polyols, diethylene glycol, triethylene glycol, polyethylene glycol; or orthoesters such as trimethyl or triethyl orthoformates, or orthoacetates.

Another optional ingredient to the composition is a buffer added in combination with the weak acid to maintain the pH of the composition within a relatively narrow range to maintain the effectiveness of the enzymatic breaker component of the composition. Examples of buffers are water-soluble salts of weak acids such as phosphate salts, such as monopotassium phosphate, dipotassium phosphate, monosodium phosphate, disodium phosphate, monoammonium phosphate; carbonate salts, such as sodium carbonate, potassium carbonate; bicarbonate salts, such as sodium bicarbonate; or carboxylic acid salts, such as sodium or potassium formate, acetate, propionate, citrate, lactate, and glycolate.

The composition may also optionally include a chelating agent to remove the inorganic bridging agent from the filter cake by coordinating with and solubilizing the cation of the bridging agent, facilitating its removal from the filter cake. Examples of suitable chelating agents are ethylenediaminetetraacetic acid (EDTA), diethylenetriaminepentaacetic acid (DTPA), nitrilotriacetic acid (NTA), ethylene glycol-bis(2-aminoethyl)-N,N,N',N'-tetraacetic acid (EGTA), 1,2-bis(o-aminophenoxy)ethane-N,N,N',N'-tetraaceticacid (BAPTA), cyclohexanediaminete-traacetic acid (CDTA), triethylenetetraaminehexaacetic acid (TTHA), N-(2-Hydroxyethyl)ethylenediamine-N,N',N'-triacetic acid (HEDTA), glutamic-N,N-diacetic acid (GLDA), ethylenediaminetetramethylene sulfonic acid (EDTMS), diethylenetriamine penta-methylene sulfonic acid (DETPMS), amino tri-methylene sulfonic acid (ATMS), ethylene-diaminetetramethylene phosphonic acid (EDTMP), diethylenetriamine pentamethylene phosphonic acid (DETPMP), and amino trimethylene phosphonic acid (ATMP). In practice, the chelating agent of choice will be compatible with the enzyme used in the composition in order to avoid deactivation of the enzyme.

The composition may also include a co-solvent to increase the solubility of the enzyme inhibitor in the carrier fluid, making it more effective in moderating the activity of the enzyme breaker. Exemplary co-solvents include ethylene glycol, propylene glycol, glycerol, isopropyl alcohol and n-propanol. The concentration of the co-solvent will be chosen so as to dissolve or disperse the enzyme inhibitor in the enzymatic breaker composition.

The composition may also include a surfactant to disperse a low-solubility enzyme inhibitor in the carrier fluid, making it more effective in moderating the activity of the enzyme breaker. Exemplary surfactants include sodium dodecyl sulfonate (SDS) and sodium dodecylbenzene sulfonate; cationic surfactant, e.g. quaternary amines, imidizoliums, pyridiniums; nonionic surfactant surfactants having hydrophilic-lipophilic balance (HLB) values above 13, e.g. polysorbate or ethoxylated polysorbate having HLB values above 13 (Tween 20, Tween 60, and Tween 80 are examples and are commercially available from Stepan and Croda); alkyl polyglucoside; ethoxylated fatty alcohols; monoesters of polyglycols; and fatty acids.

The enzyme breaker of the composition may be sensitive to the choice of optional chelating agent or to the pH of the composition. The optional chelating agent, weak acid and overall pH of the composition should be chosen and used so as to avoid deactivation of the enzymatic breaker. To detect deactivation, the formation of a precipitate in the formulation of the composition may be an indication of deactivation.

The composition may exclude viscosifying biopolymers, that is non-enzymatic biopolymers used as viscosifiers in the drilling fluid. This has the advantage that the enzymatic breaker of the composition first contacts a biopolymer that has used as a viscosifier when the composition contacts the filter cake. Adding viscosifying biopolymer to the composition would tend to detract from the filter cake removal activity of the composition.

The composition may be used to remove filter cake from a borehole across the range of normal working temperatures. It is notable that this composition can be used effectively at lower working temperatures in the range. For example, the composition of the present disclosure can be used at temperatures from 70° F. to 200° F. (20° C. to 90° C.). More specifically, the composition of the present disclosure can be used at temperatures from 80° F. to 180° F. (25° C. to 80°

C.). The composition of the present disclosure can also be used at temperatures from 100° F. to 150° F. (35° C. to 65° C.).

The present disclosure also provides methods for using the composition to remove the filter cake from a borehole and are illustrated in FIGS. 1-4.

FIG. 1 shows a close up view of filter cake 110 as a layer on an openhole section 116 of a borehole 114 in a subterranean formation 118.

Figure 2:
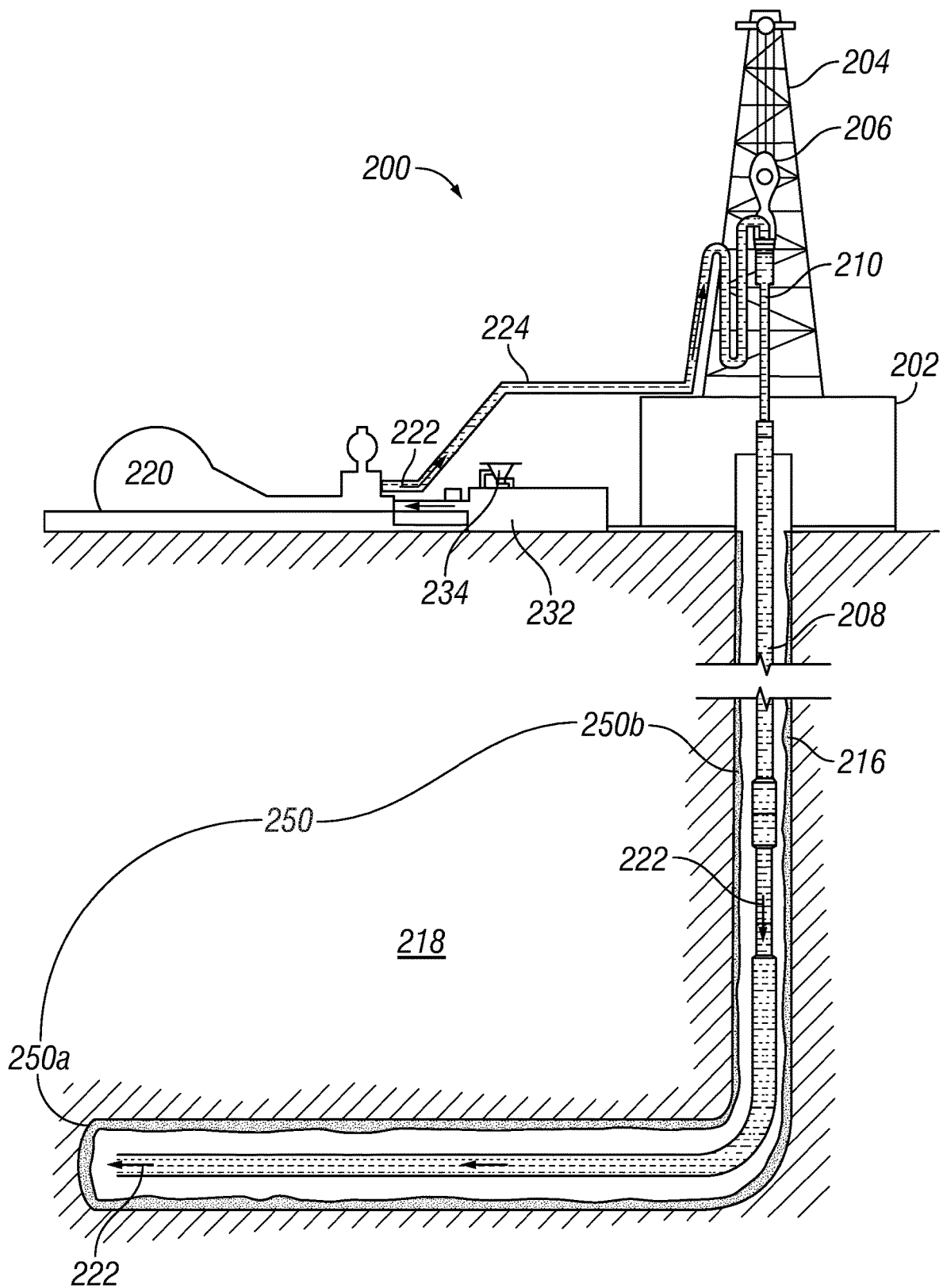
FIG. 2 is a diagram illustrating a borehole through a subterranean formation that is treated according to one or more embodiments.

FIG. 2 shows a treatment assembly 200 that may include a platform 202 that supports a derrick 204 having a traveling block 206 for raising and lowering a work string 208. The treatment assembly 200 is shown as an onshore assembly, although a person of skill in the art with the benefit of this disclosure will recognize that the methods of the present disclosure may be applied as well to offshore production. The work string 208 may include, but is not limited to, pipe and coiled tubing, as generally known to those skilled in the art. A kelly 210 supports the work string 208 as the work string 208 is lowered below the platform 202 and into a borehole 216 that penetrates various subterranean formations 218. Borehole 216 is depicted as having a vertical section and a downhole horizontal section, although a person of skill in the art with the benefit of this disclosure will recognize that the methods of the present disclosure may be applied to boreholes of any configuration and/or orientation. A filter cake 250 is formed on the wall of borehole 216 and may have been deposited in borehole 216 in the course of a drilling operation. At a point in the borehole operations, it may become desirable to remove filter cake 250, such as to allow production of fluids from the formation 218 into the borehole 216.

To remove the filter cake 250, a composition as described may be prepared, such as, in one or more blender unit(s) 232. Those skilled in the art will readily appreciate that the blender unit(s) 232 may be arranged at any location in the treatment assembly 200 than shown, without departing from the scope of the scope of the disclosure. One or more components or additives may be added to the enzymatic breaker of the composition in the blender unit 232 via a hopper 234 communicably coupled to or otherwise in fluid communication therewith. The hopper 234 may include, but is not limited to, bins and metering equipment known to those skilled in the art. The blender unit(s) 232 may further include one or more sensors, gauges, pumps, compressors, and the like used store, monitor, regulate, and/or condition the treatment fluid(s). A pump 220 (e.g., a mud pump) circulates the prepared composition 222 through a feed pipe 224 and to the kelly 210, which conveys the composition 222 downhole through the interior of the work string 208 and through one or more orifices at a downhole end of the work string 208.

Figure 3:
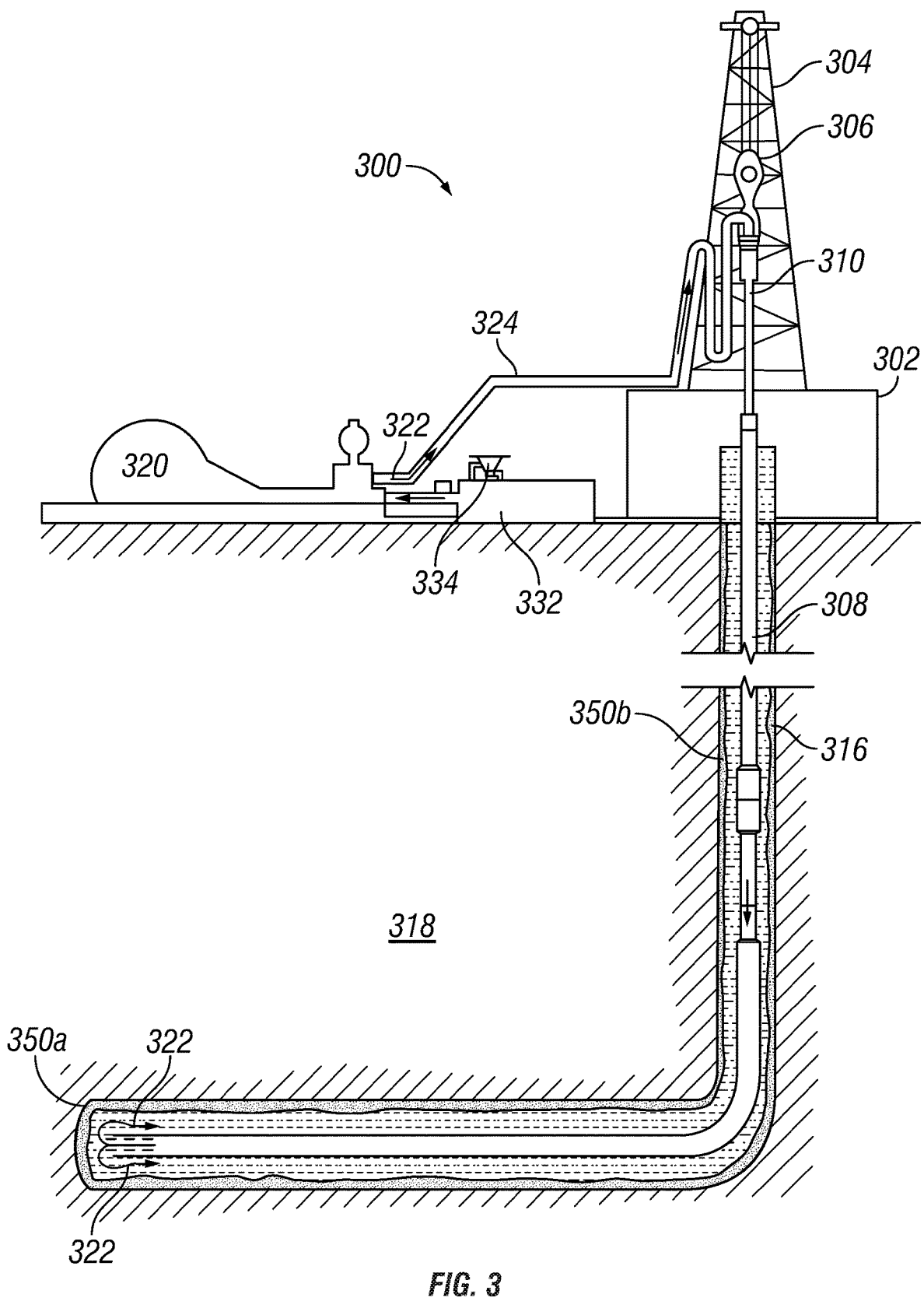
FIG. 3 is a diagram illustrating a borehole through the subterranean formation of FIG. 2 at a subsequent point in time during the treatment according to one or more embodiments.

As shown in FIG. 3, the composition 322 then circulates into the annular region between the outer surface of work string 308 and the wall of borehole 316. As shown the components 300-350 are defined the same as the components 200-250 of FIG. 2. By contacting the filter cake 350, enzymatic breaker composition 322 may degrade it, facilitating its circulation out of the borehole.

Figure 4:
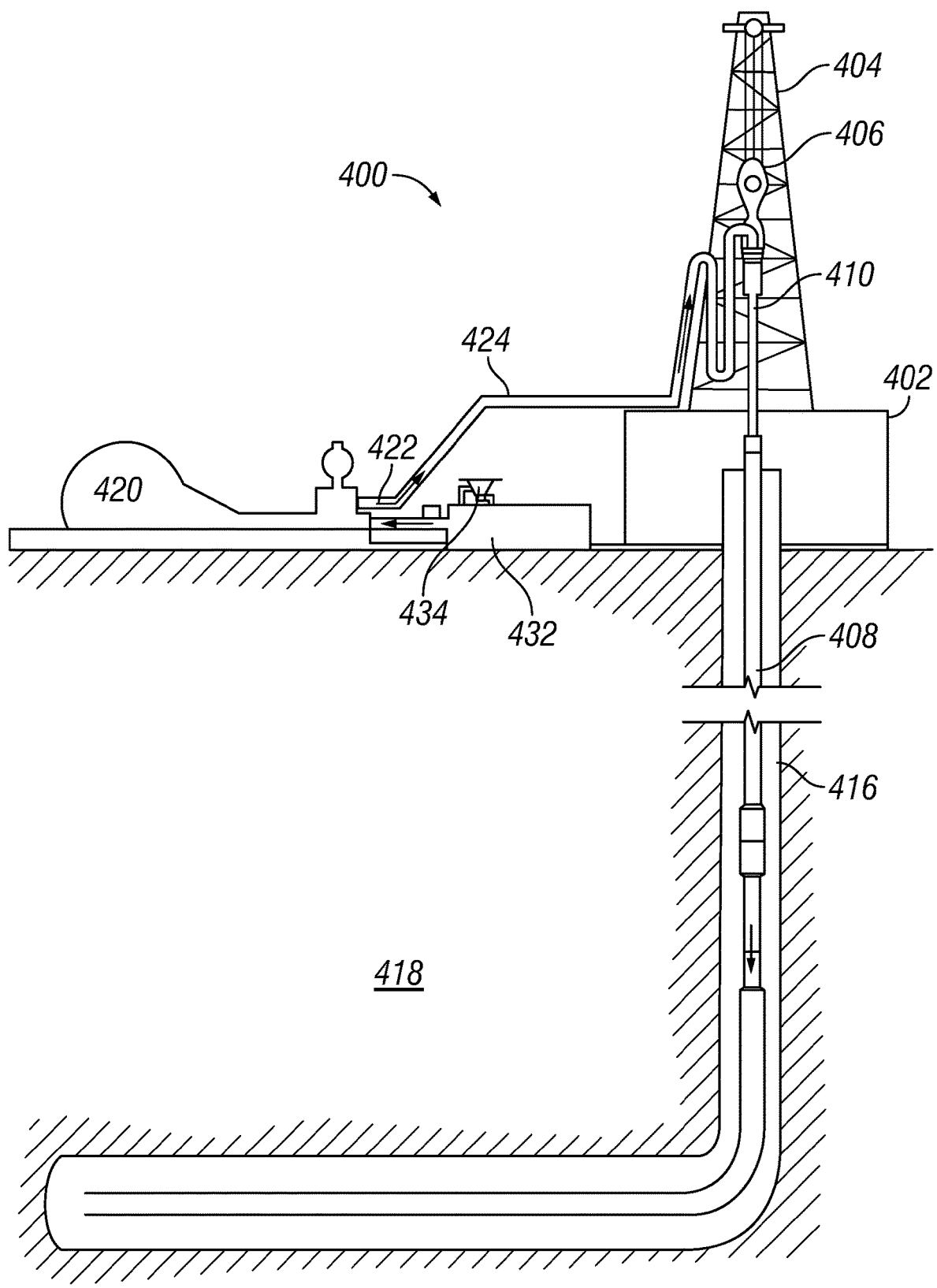
FIG. 4 is a diagram illustrating the borehole through the subterranean formation of FIG. 2 following a treatment according to one or more embodiments.

In conventional treatments, the enzymatic breaker composition 322 might quickly react with a portion 350a of the filter cake proximate to where the enzymatic breaker composition 322 exits the work string 308 such that the concentration of enzymatic breaker composition 322 is significantly less by the time it reaches other portions 350b of the filter cake further uphole. This may result in the removal of less of the filter cake in region 350b or other uphole regions than is desirable. However, in certain embodiments of the present disclosure, the enzyme inhibitor may delay the reaction of the enzymatic breaker composition 322 with the portion of filter cake 350a, for example, until the enzymatic breaker composition 322 can be circulated into the remainder of the borehole 316. This may allow for a more thorough and even removal of the filter cake 350, for example, as illustrated in FIG. 4, where components 400-434 are defined the same as components 200-234 of FIG. 2.

After the filter cake has been removed, the borehole may be completed by known open hole completion techniques. The open hole completion may include casing the borehole above a production zone, which is not cased. The casing may extend to the production zone. Alternatively, the open hole completion may include extending a liner from the production zone to an end of the casing. It will be understood the techniques of the present disclosure may also be used in gravel pack completions and in stand-alone completions.

One or more specific embodiments of the composition, systems, and methods have been described. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

Certain terms are used throughout the description and claims to refer to particular features or components. As one skilled in the art will appreciate, different persons may refer to the same feature or component by different names. This document does not intend to distinguish between components or features that differ in name but not function.

Unless otherwise indicated, a numerical parameter "n" expressing quantities used in the present disclosure and associated claims means "about n". Accordingly, unless otherwise indicated, reference to a numerical parameter in the specification and attached claims is an approximation that may vary depending upon the property the numerical parameter represents and the measurement method used to determine the property. For example, the approximation may be at least that of significant digits, with each numerical parameter given to not more than significant digits. For example, the appropriate number of significant digits associated with a measurement method is a baseline for the degree of approximation. For numerical parameters reported in alternative units ordinary rounding techniques are applied. For example, ° C. and ° F. are alternative units and kilogram (kg) and pound (lb) are alternative units.

Whenever a numerical range with a lower and upper limit is disclosed, any number and any included range falling within the range is specifically disclosed. In particular, every range of values is to be understood to set forth every number and range encompassed within the broader range of values. Reference to "from n to m" indicates a closed range [n,m]. Reference to "from n to less than m" indicates a half open range [n,m). Reference to "greater than n and up to m" indicates another half open range (n,m]. Reference to "greater than a and less than b" indicates an open range (n,m).

Reference throughout this specification to "include" means include, but is not limited to. Likewise, reference through this specification to "includes" means includes, but is not limited to.

Reference throughout this specification to "one embodiment," "an embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

Methods of servicing a borehole in a subterranean formation may include: contacting a filter cake disposed along a wall of the borehole and including a biopolymer with a composition including a carrier fluid, an enzymatic breaker, and an enzyme inhibitor; degrading the biopolymer with the enzymatic breaker to produce degraded biopolymer; slowing down the degrading activity of the enzymatic breaker with the enzyme inhibitor sufficiently that the degrading comprises degrading biopolymer along a length of the wall of the borehole; and removing the filter cake from the wall of the borehole.

The methods may include the embodiments of any preceding paragraph or combination thereof where the composition excludes the biopolymer such that the method further comprises maintaining the enzymatic breaker out of contact with the biopolymer until the filter cake contacts the composition.

The methods may include the embodiments of any preceding paragraph or combination thereof where the enzymatic breaker comprises a hydrolase such that the degrading comprises hydrolyzing.

The methods may include the embodiments of any preceding paragraph or combination thereof where the methods further comprises selecting a brine as the carrier fluid so as to provide density to the carrier fluid with a salt of the brine.

The methods may include the embodiments of any preceding paragraph or combination thereof and further include solubilizing the enzyme inhibitor in the brine with a surfactant and/or a co-solvent.

The methods may include the embodiments of any preceding paragraph or combination thereof and further include solubilizing a bridging agent of the filter cake with the composition so as to facilitate the removing, wherein the composition further comprises the weak acid or a generator thereof.

The methods may include the embodiments of any preceding paragraph or combination thereof and further include chelating a bridging agent of the filter cake with a chelating agent so as to facilitate removing the filter cake, wherein the composition further comprises the chelating agent.

The methods may include the embodiments of any preceding paragraph or combination thereof where the enzyme inhibitor is selected from the group consisting of phenolic inhibitors, salts of phenolic inhibitors, esters of phenolic inhibitors, carbohydrate-based cellulase inhibitors, vitamins, tannins, flavenoids, chlorogenic acid, caffeic acid, cinnamic acid, derivatives thereof, and combinations thereof.

For example, methods of servicing a borehole in a subterranean formation may include: contacting a filter cake disposed along a wall of the borehole and including a biopolymer with a composition including a carrier fluid, an enzymatic breaker, and an enzyme inhibitor; degrading the biopolymer with the enzymatic breaker to produce degraded biopolymer; slowing down the degrading activity of the enzymatic breaker with the enzyme inhibitor sufficiently that the degrading comprises degrading biopolymer along a length of the wall of the borehole; removing the filter cake from the wall of the borehole; selecting brine as the carrier fluid so as to provide density to the carrier fluid with a salt of the brine; adding a surfactant and/or co-solvent to the composition, so as to solubilize the enzyme inhibitor in the brine; and solubilizing a bridging agent of the filter cake with a weak acid and/or chelating the bridging agent with a chelating agent so as to facilitate the removing, where the composition further includes a component selected from the group consisting of the weak acid, a generator thereof, the chelating agent and combinations thereof, where the enzymatic breaker includes a hydrolase such that the degrading comprises hydrolyzing, where the composition excludes the biopolymer such that the methods further include maintaining the enzymatic breaker out of contact with the biopolymer until the filter cake contacts the composition, where the enzyme inhibitor is selected from the group consisting of phenolic inhibitors, salts of phenolic inhibitors, esters of phenolic inhibitors, carbohydrate-based cellulase inhibitors, vitamins, tannins, flavenoids, chlorogenic acid, caffeic acid, cinnamic acid, derivatives thereof, and combinations thereof.

Compositions for servicing a borehole in a subterranean formation by removing a filter cake disposed along a wall of the borehole and including a biopolymer, the composition may include: a carrier fluid effective to act as a transport medium; an enzymatic breaker having activity to degrade the biopolymer in the filter cake upon contact with the filter cake so as to break up the biopolymer for removal; and an enzyme inhibitor effective to slow down the activity of the enzymatic breaker; and wherein the composition excludes the biopolymer.

The compositions may include the embodiments of any preceding paragraph or combination thereof where the enzymatic breaker comprises a hydrolase effective to react with the biopolymer of the filter cake.

The compositions may include the embodiments of any preceding paragraph or combination thereof where the carrier fluid includes a brine effective to provide density to the carrier fluid with the salt of the brine.

The compositions may include the embodiments of any preceding paragraph or combination thereof and further include a weak acid or a generator thereof effective to solubilize a bridging agent of the filter cake.

The compositions may include the embodiments of any preceding paragraph or combination thereof and further include a chelating agent effective to facilitate removal of a bridging agent of the filter cake.

The compositions may include the embodiments of any preceding paragraph or combination thereof and further include a surfactant effective to disperse the enzyme inhibitor.

The compositions may include the embodiments of any preceding paragraph or combination thereof and further include a co-solvent effective to disperse the enzyme inhibitor.

The compositions may include the embodiments of any preceding paragraph or combination thereof wherein the enzyme inhibitor is selected from the group consisting of phenolic inhibitors, salts of phenolic inhibitors, esters of phenolic inhibitors, carbohydrate-based cellulase inhibitors, vitamins, tannins, flavenoids, chlorogenic acid, caffeic acid, cinnamic acid, derivatives thereof, and combinations thereof.

For example, compositions for servicing a borehole in a subterranean formation by removing a filter cake disposed along a wall of the borehole and including a biopolymer, the composition may include: a carrier fluid effective to act as a transport medium; an enzymatic breaker having activity to degrade the biopolymer in the filter cake upon contact with the filter cake so as to break up the biopolymer for removal; an enzyme inhibitor effective to slow down the activity of the enzymatic breaker; a weak acid, a weak acid generator, and/or a chelating agent as a component effective to facilitate removal of a bridging agent of the filter cake; and a surfactant and/or co-solvent as a component effective to disperse the enzyme inhibitor, where the composition excludes the biopolymer, where the enzymatic breaker includes a hydrolase effective to react with the biopolymer of the filter cake, where the carrier fluid includes a brine a brine effective to provide density to the carrier fluid with the salt of the brine, where the enzyme inhibitor is selected from the group consisting of phenolic inhibitors, salts of phenolic inhibitors, esters of phenolic inhibitors, carbohydrate-based cellulase inhibitors, vitamins, tannins, flavenoids, chlorogenic acid, caffeic acid, cinnamic acid, derivatives thereof, and combinations thereof.

A system for delivering the compositions to the borehole, may include a blender unit; a pump in fluid communication with the blender unit; and a work string in fluid communication with the pump and extending into the borehole.

What is claimed is:

1. A method of servicing a borehole in a subterranean formation comprising:
   circulating a composition comprising a carrier fluid, an unencapsulated enzymatic breaker, and an enzyme inhibitor in the borehole to contact the composition with a filter cake disposed along a wall of the borehole, the filter cake comprising a biopolymer; and
   removing the filter cake from the wall of the borehole by degrading the biopolymer with the unencapsulated enzymatic breaker while slowing a degrading activity of the unencapsulated enzymatic breaker with the enzyme inhibitor.

2. The method of claim 1, wherein the composition excludes viscosifying biopolymers such that the unencapsulated enzymatic breaker does not contact any biopolymers until the composition contacts the filter cake.

3. The method of claim 1, wherein the unencapsulated enzymatic breaker comprises a hydrolase such that the degrading comprises hydrolyzing.

4. The method of claim 1, wherein the method further comprises selecting a brine as the carrier fluid so as to provide density to the carrier fluid with a salt of the brine.

5. The method of claim 4, further comprising solubilizing the enzyme inhibitor in the brine with a surfactant.

6. The method of claim 4, further comprising solubilizing the enzyme inhibitor in the brine with a co-solvent.

7. The method of claim 1, further comprising solubilizing a bridging agent of the filter cake with the composition so as to facilitate the removing, wherein the composition further comprises a weak acid or a generator thereof.

8. The method of claim 1, further comprising chelating a bridging agent of the filter cake with a chelating agent so as to facilitate the removing, wherein the composition further comprises the chelating agent.

9. The method of claim 1, wherein the enzyme inhibitor is selected from the group consisting of phenolic inhibitors, salts of phenolic inhibitors, esters of phenolic inhibitors, carbohydrate-based cellulase inhibitors, vitamins, tannins, flavenoids, chlorogenic acid, caffeic acid, cinnamic acid, derivatives thereof, and combinations thereof.

10. The method of claim 1, wherein the unencapsulated enzymatic breaker comprises a hydrolase such that the degrading comprises hydrolyzing, wherein the composition excludes viscosifying biopolymers such that the unencapsulated enzymatic breaker does not contact any biopolymers until the composition contacts the filter cake, the enzyme inhibitor is selected from the group consisting of phenolic inhibitors, salts of phenolic inhibitors, esters of phenolic inhibitors, carbohydrate-based cellulase inhibitors, vitamins, tannins, flavenoids, chlorogenic acid, caffeic acid, cinnamic acid, derivatives thereof, and combinations thereof and further comprising:
   selecting brine as the carrier fluid so as to provide density to the carrier fluid with a salt of the brine;
   adding a surfactant and/or co-solvent to the composition, so as to solubilize the enzyme inhibitor in the brine; and
   solubilizing a bridging agent of the filter cake with a weak acid and/or chelating the bridging agent with a chelating agent so as to facilitate the removing, wherein the composition further comprises a component selected from the group consisting of the weak acid, a generator thereof, the chelating agent and combinations thereof.

11. A composition for servicing a borehole in a subterranean formation by removing a filter cake disposed along a wall of the borehole and including a biopolymer, the composition comprising:
    a carrier fluid effective to circulate in the borehole and act as a transport medium;
    an unencapsulated enzymatic breaker having activity to degrade the biopolymer in the filter cake upon contact with the filter cake so as to break up the biopolymer for removal of the filter cake; and
    an enzyme inhibitor effective to slow the degrading activity of the unencapsulated enzymatic breaker.

12. The composition of claim 11, wherein the unencapsulated enzymatic breaker comprises a hydrolase effective to react with the biopolymer of the filter cake.

13. The composition of claim 11, wherein the carrier fluid comprises a brine effective to provide density to the carrier fluid with the salt of the brine.

14. The composition of claim 11, wherein the composition further comprises a weak acid or a generator thereof effective to solubilize a bridging agent of the filter cake.

15. The composition of claim 11, wherein the composition further comprises a chelating agent effective to facilitate removal of a bridging agent of the filter cake.

16. The composition of claim 11, wherein the composition further comprises a surfactant effective to disperse the enzyme inhibitor.

17. The composition of claim 11, wherein the composition further comprises a co-solvent effective to disperse the enzyme inhibitor.

18. The composition of claim 11, wherein the enzyme inhibitor is selected from the group consisting of phenolic inhibitors, salts of phenolic inhibitors, esters of phenolic inhibitors, carbohydrate-based cellulase inhibitors, vitamins, tannins, flavenoids, chlorogenic acid, caffeic acid, cinnamic acid, derivatives thereof, and combinations thereof.

19. The composition of claim 11, wherein the unencapsulated enzymatic breaker comprises a hydrolase effective to react with the biopolymer of the filter cake, wherein the carrier fluid comprises a brine effective to provide density to the carrier fluid with the salt of the brine, the enzyme inhibitor is selected from the group consisting of phenolic inhibitors, salts of phenolic inhibitors, esters of phenolic inhibitors, carbohydrate-based cellulase inhibitors, vitamins, tannins, flavenoids, chlorogenic acid, caffeic acid, cinnamic acid, derivatives thereof, and combinations thereof, and wherein the composition further comprises:
- a weak acid, a weak acid generator, and/or a chelating agent as a component effective to facilitate removal of a bridging agent of the filter cake; and
- a surfactant and/or co-solvent as a component effective to disperse the enzyme inhibitor.

20. A system for delivering the composition of claim 11 to the borehole, comprising:
- a blender unit;
- a pump in fluid communication with the blender unit; and
- a work string in fluid communication with the pump and extending into the borehole.

\* \* \* \* \*